June 3, 1930.  C. A. MARIS  1,761,139
ADJUSTABLE THRUST BEARING
Filed Nov. 19, 1927
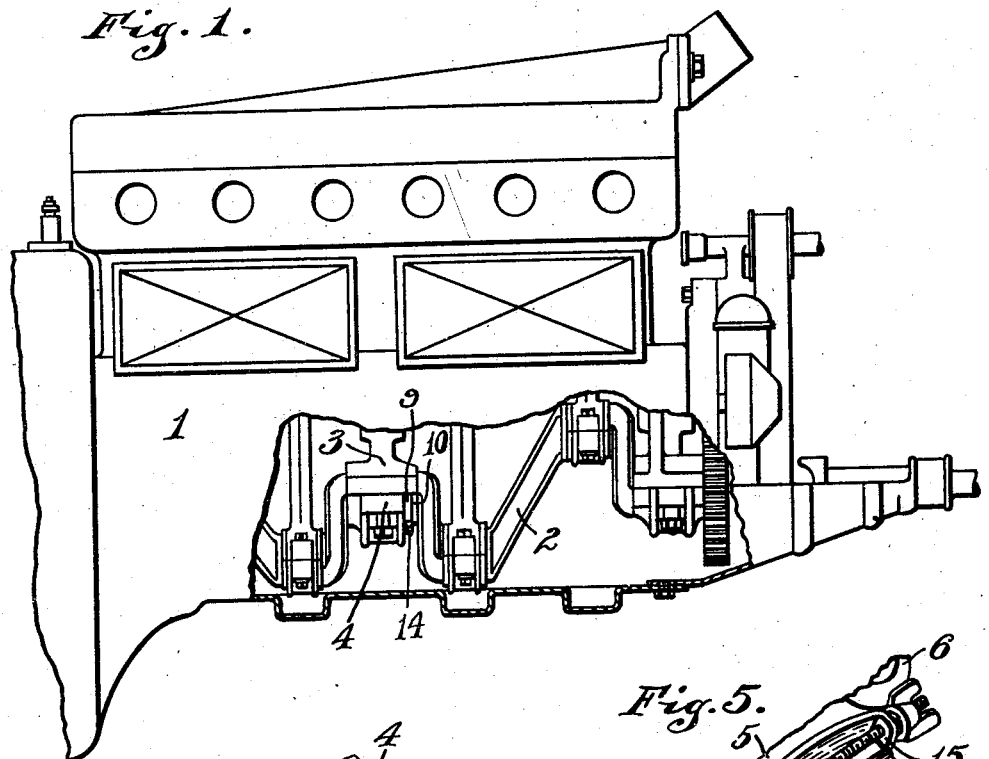
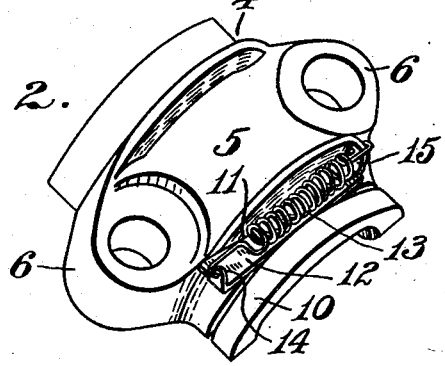
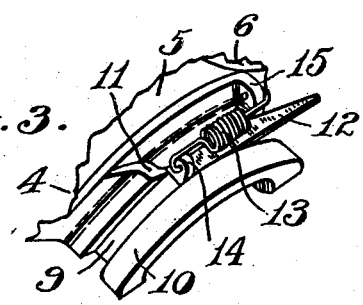
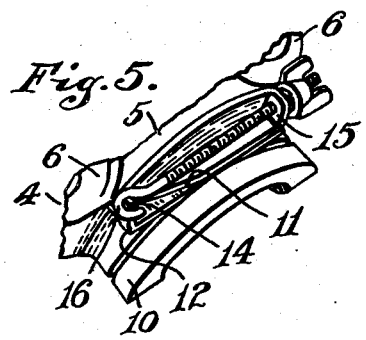
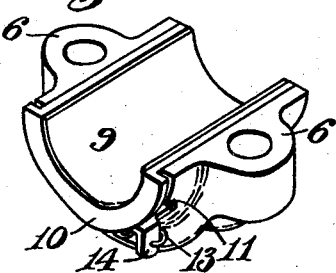
INVENTOR
Claude A. Maris,
BY
Hood + Hahn.
ATTORNEYS Patented June 3, 1930

1,761,139

UNITED STATES PATENT OFFICE

CLAUDE A. MARIS, OF INDIANAPOLIS, INDIANA

ADJUSTABLE THRUST BEARING

Application filed November 19, 1927. Serial No. 234,328.

My invention relates to adjustable thrust bearings, and particularly to the thrust bearing of the type used in Ford automobiles. In this type of automobile the bearing caps of the bearings for the crank shafts wear at their ends and as a result the crank shaft attains too great an end play. In order to cure this end play it has been considered necessary to replace the worn parts, including the crank shaft and this has involved considerable expense in the tearing down of the parts and replacing with new parts.

In the construction of the Ford car of the model T type there is a middle bearing for the crank shaft which may be very readily manipulated and removed and replaced.

One of the objects of the present invention is to provide an article of manufacture which may be used as a convenient substitute for the central bearing cap of the crank shaft in the model T Ford cars of such a form that end play of the shaft may be readily compensated and which will automatically compensate this end play without the necessity of frequent adjustment.

For the purpose of disclosing my invention I have illustrated one embodiment thereof in the accompanying drawings, in which—

Fig. 1 is a fragmentary vertical section of a model T Ford engine and adjacent parts;

Fig. 2 is a perspective view of my improved adjustable bearings;

Fig. 3 is a detail perspective;

Fig. 4 is a perspective view looking from the opposite side, and

Fig. 5 is a detail perspective of a modified form of my invention.

Referring to the drawings: The model T Ford engine 1 is provided with the usual crank shaft 2 which is provided with a central bearing having a half-bearing portion 3 with which co-operates my improved substitute bearing cap 4 which is adapted for attachment thereto. This bearing cap consists of a main body portion 5 having perforated lugs 6—6 for attachment of the same to the stationary bearing portion 3 and having an axially movable bearing bushing 9 at its outer end provided with a semi-annular flange 10 adapted to take the thrust of the crank shaft.

The main body and bushing are so relatively proportioned that initially the effective length of the bearing portion 9 and main body is such as to fit snugly between the end shoulders of the middle bearing of the crank shaft 2. On the outer surface of the bearing member 5, at the end adjacent the flange 10, I form a transverse slot 11 which is adapted to receive a wedge 12, the outer edge of which bears on the inner edge of the flange 10 and this wedge is biased in a direction to move the bearing bushing 9 axially in the main body, by means of a coil spring 13, one end of which is hooked into a lug 14 on the wedge 12 and the opposite end into a lug 15 on the main bearing body 5. Due to this construction, as the parts wear, the effective length of the bearing is increased automatically so as to take up any wear in the adjacent shoulder of the crank shaft and thus prevent end play of the crank shaft.

In Fig. 5 I have illustrated a modified form of my invention. In this structure instead of providing a spring such as 13 for moving the wedge 12, I provide a screw, one end 16 of which is secured to the ear 14 of the wedge 12 and the other end passes through an opening in the lug 15. A nut is threaded on the end of this screw and by adjusting the nut the wedge 12 may be drawn up in its slot to project the bushing.

My improved cap should be arranged with the bushing 9 at its forward end so that its outward axial movement will tend to draw the crank shaft forward so as to bring the rotor on the rear end of the crank shaft in proper relationship with the pole pieces with which this rotor co-operates, thus maintaining the various parts in proper alinement.

I claim:

1. As an article of manufacture, a bearing cap comprising a main body, a bearing bushing axially movable in said cap and provided with a flange at one end overlying the main body, one of said parts having a transverse slot tangential to the bearing axis, a wedge mounted in said slot between the main body and the flange, and spring means by which said wedge may be forced between the main body and flange to project the bushing outwardly relative to the main body.

2. As an article of manufacture, a bearing cap comprising a main body, a bearing bushing axially movable in said cap and provided with a flange at one end overlying the main body, one of said parts having a transverse slot tangential to the bearing axis, a wedge mounted in said slot between the main body and the flange, and means by which said wedge may be forced between the main body and flange to project the bushing outwardly relative to the main body.

In witness whereof, I, CLAUDE A. MARIS, have hereunto set my hand at Indianapolis, Indiana, this 16th day of November, A. D. one thousand nine hundred and twenty-seven.

CLAUDE A. MARIS.